United States Patent [19]
Abat

[11] Patent Number: 5,306,870
[45] Date of Patent: Apr. 26, 1994

[54] SCREENED CABLE BRANCH CONNECTION DEVICE

[75] Inventor: Fernand Abat, Vauvert, France

[73] Assignee: Societe Logistel, Vauvert, France

[21] Appl. No.: 891,045

[22] Filed: Jun. 1, 1992

[30] Foreign Application Priority Data

Jul. 3, 1991 [FR] France .................................. 91 08320

[51] Int. Cl.$^5$ ............................................. H02G 3/18
[52] U.S. Cl. ................... 174/65 R; 174/71 R; 439/394; 439/404; 439/582
[58] Field of Search ................ 174/65 R, 52.1, 59, 174/60, 71 R, 71 C, 92, 93, 138 F; 439/394, 404, 521, 578–584

[56] References Cited

U.S. PATENT DOCUMENTS

| | | | |
|---|---|---|---|
| 2,511,524 | 6/1950 | Adler | 439/585 X |
| 4,451,696 | 5/1984 | Beinhaur | 439/521 X |
| 4,533,197 | 8/1985 | Prince et al. | 439/404 |
| 4,533,201 | 8/1985 | Wasserlein, Jr. | 439/404 |
| 4,701,137 | 10/1987 | DeRoss | 439/394 |
| 4,708,661 | 11/1987 | Morland et al. | 439/581 X |
| 5,044,978 | 9/1991 | Gelin | 439/579 |
| 5,173,573 | 12/1992 | Jervis | 439/521 X |

FOREIGN PATENT DOCUMENTS 3822573  1/1990  Fed. Rep. of Germany ...... 439/580

Primary Examiner—Peter Dungba Vo
Attorney, Agent, or Firm—Sandler Greenblum & Bernstein

[57] ABSTRACT

A device for making branch connections to screened cables comprising an insulative material in which electrical conductors are embedded, an insulative sheath enclosing the insulative material and a metal braid comprises rings adapted to be crimped to the respective ends of the screened cables over the previously exposed braid and a metal casing in the form of two half-shells adapted to nest one within the other and comprising complementary notches. The rings are accommodated in the notches at the crimps.

20 Claims, 2 Drawing Sheets

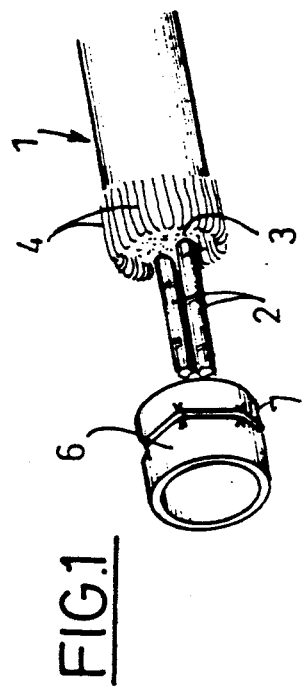
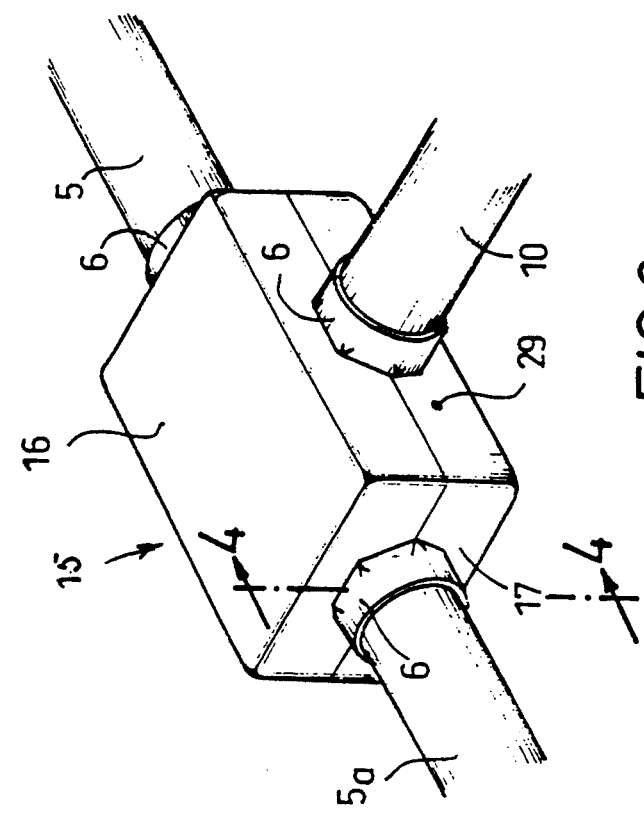
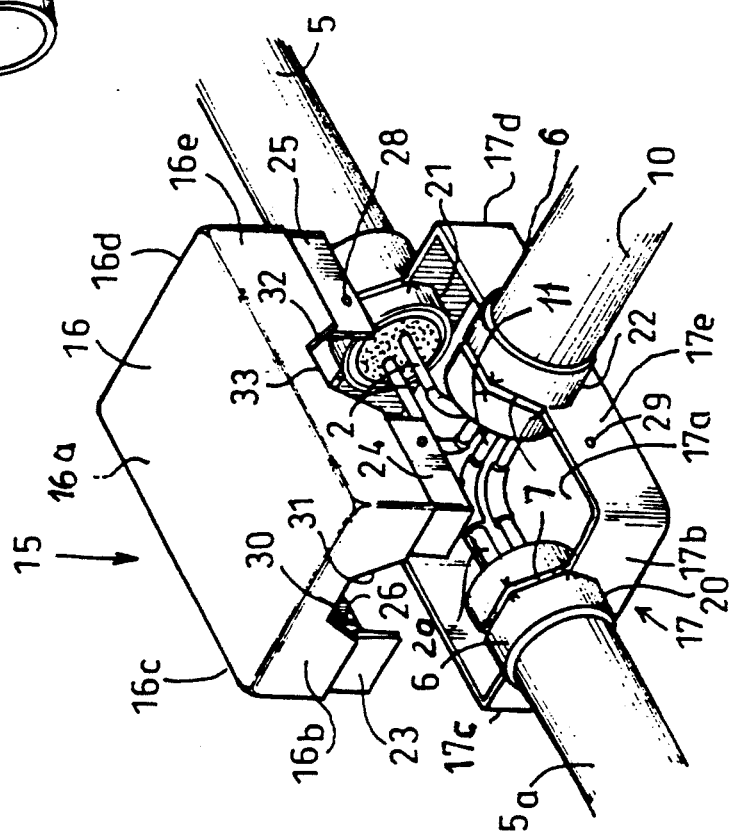

SCREENED CABLE BRANCH CONNECTION DEVICE

BACKGROUND OF THE INVENTION

1. Field of the Invention

The present invention is directed to devices for making branch connections to screened cables.

2. Description of the Prior Art

Many machines employ screened cables to protect them against interference. The screening must extend the full length of the cable, which prevents the making of branch connections. Where a plurality of machines is to be connected it is then necessary to provide a separate screened cable for each machine, which takes up a lot of room and is hardly practical.

One object of the present invention is to provide a simple device for making branch connections to screened cables.

SUMMARY OF THE INVENTION

The invention consists in a device for making branch connections to screened cables comprising an insulative material in which electrical conductors are embedded, an insulative sheath enclosing the insulative material and a metal braid, which device comprises rings adapted to be crimped to the respective ends of the screened cables over the previously exposed braid and a metal casing in the form of two half-shells adapted to nest one within the other and comprising complementary notches, the rings being accommodated in the notches at the crimps.

By this means it is a simple matter to make branch connections to screened cables, either during fabrication or by the end user during installation.

The metal casing is preferably accommodated in a plastics material shroud.

The plastics material shroud is preferably in the form of two half-shrouds adapted to be fastened together.

The rings are preferably crimped to form a hexagonal crimp and the notches of one half-shell and the complementary notches of the other half-shell are preferably hexagonal. As a result the ring is retained securely to the screened cable and a good connection is obtained between the ring and the casing, the cable and the ring when fitted having a good resistance to pulling out, which is a good safety feature.

Each half-shell is preferably parallelepiped-shaped with a back and four side walls, the side walls of one half-shell being extended by a skirt adapted to be inserted between the side walls of the other half-shell which comprise on their inside surface stamped regions, the skirt comprising projections adapted to be inserted in the stamped regions.

BRIEF DESCRIPTION OF THE DRAWINGS

The invention will now be described in more detail with reference to embodiments shown by way of example only in the appended drawings.

FIG. 1 is a perspective view showing the fitting of a ring onto a screened cable.

FIG. 2 is an exploded perspective view of a device in accordance with the invention.

FIG. 3 is a perspective view of the assembled device.

DETAILED DESCRIPTION OF THE INVENTION

Figure 4:
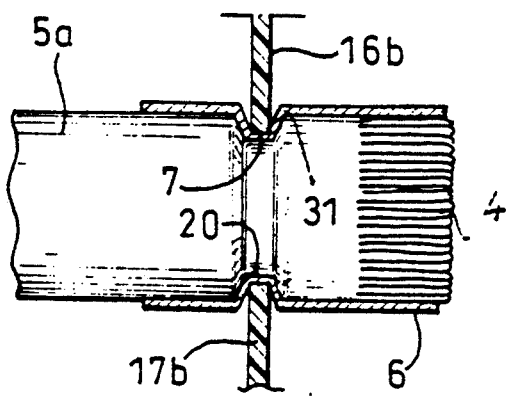
FIG. 4 is a view in cross-section on the line 4—4 in FIG. 3.

FIG. 1 shows a screened cable 1 comprising conductors 2 embedded in an insulative material 3 accommodated in a tubular metal braid 4 in turn accommodated in an insulative sheath 5.

The free end of the cable 1 is stripped to expose the conductors 2 and the braid 4 is folded back over the outside surface of the sheath 5. The prepared end is inserted in a cylindrical ring 6 of the appropriate size.

At an intermediate point lengthwise of the ring 6 a crimp 7 is formed so as to fix the ring 6 strongly to the cable and to obtain a good connection between the braid 4 and the ring 6. The crimping is done in such a way as to form a hexagonal groove.

As shown in FIG. 2, a ring 6 is fitted in the same way to a cable 10. The screened cable 10 includes four conductors 11 of which two are to be connected to the conductors of a cable 5 and the other two to the conductors 2a of a cable 5a by means of sleeves crimped or soldered to the conductors, for example.

The device is completed by a casing 15 in the form of two metal half-shells 16 and 17.

The half-shell 16 is generally parallelepiped-shaped with a back 16a and four side walls 16b, 16c, 16d and 16e.

The shape of the half-shell 17 matches that of the half-shell 16 and it has a back 17a and four side walls 17b, 17c, 17d and 17e.

The walls 17b, 17d and 17e include respective notches 20, 21 and 22 whose cross-section matches half the cross-section of a sleeve 6 at the crimp.

The side walls 16b, 16c, 16d and 16e of the half-shell 16 are extended by respective skirts 23, 26 and 25 and 24 having a height matching that of the side walls 17b, 17c, 17d and 17e and whose dimensions enable them to be inserted in the half-shell 17, the skirts being joined to the respective walls by a shoulder so that when the two half-shells are assembled together the side walls are in alignment.

The skirts 25 and 26 comprise projections 28 and the inside surface of the side walls 16b and 16e comprises cooperating stamped regions 29.

The skirt 23 has a slot opening into a notch 21 complementary to the notch 20, the skirt 24 having a slot 32 opening into a notch 33 complementary to the notch 22, the skirt 25 and the wall 16d having a slot and a notch (not seen in FIG. 2) in corresponding relationship to the notch 21. Referring to FIGS. 3 and 4, the half-shells 16 and 17 nest one within the other and the projections 28 are inserted in the respective stamped region 29, the crimps 7 being clamped in the respective notches.

Figure 6:
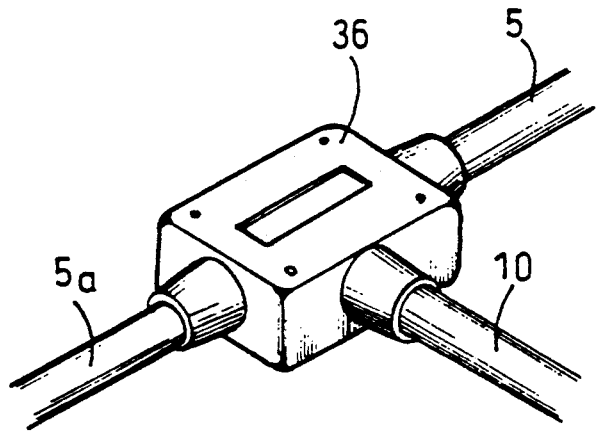
FIG. 6 is a perspective view of an alternative embodiment.

The device may be completed by overmolding a plastics material shroud 36 (see FIG. 6).

Figure 5:
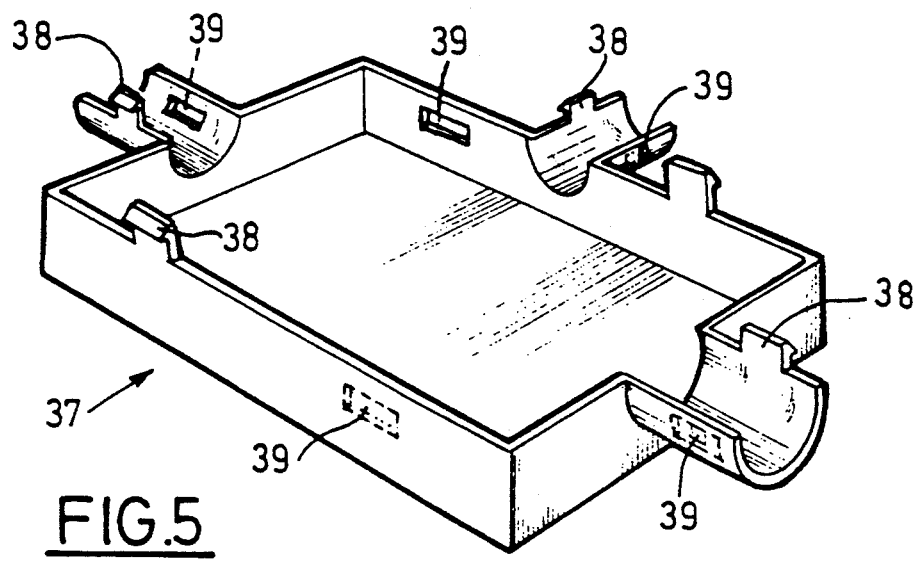
FIG. 5 is a perspective view of a plastics material shell usable on a casing.

The casing 15 may instead be housed in two plastics material half-shrouds 37 (see FIG. 5) comprising hooks 38 and shoulders 39 such that two identical half-shrouds can be assembled together with one upside down relative to the other and so enclose a casing 15.

Of course the invention is not limited to the embodiments that have just been described and shown. Numerous modifications of detail may be made thereto without departing from the scope of the invention.

What is claimed is:

1. In combination, a device for making branch connections to screened cables and screened cables, comprising:

screened cables comprising;

an insulative material;

electrical conductors embedded in said insulative material;

a metal braid on said insulative material; and an insulative sheath enclosing said metal braid;

rings adapted to be crimped on said screened cables with a hexagonal crimp, which screened cables have been striped of said insulative sheath at a portion thereof, and said metal braid is folded back on said insulative sheath at said portion;

a parallellepipedic metallic casing composed of two metallic half-shells comprising a first half-shell and a second half shell, said first half-shell comprising a first base, a first lateral wall extended by a skirt and first notches on said first lateral wall; said second half-shell comprising a second base, a second lateral wall and second notches on said second lateral wall corresponding to said first notches on said first lateral wall; said first notches and said corresponding second notches forming a holding notch having a hexagonal shape corresponding to the hexagonal shape of said crimp; and said skirt of said first lateral wall being adapted to be inserted into said second lateral wall of said second half-shell;

at least one projection and at least one corresponding recess on said extended skirt and said second lateral wall capable of interacting with each other after insertion of said skirt into said second lateral wall to fix said first half-shell and said second half-shell together; and an insulative shroud adapted to house said metallic casing.

2. The combination according to claim 1, wherein said first notches and corresponding second notches comprise equal halves of said holding notches.

3. The combination according to claim 1, wherein said plastic shroud comprises a plastic shroud which is molded onto said metal casing.

4. The combination according to claim 1, wherein said insulative shroud comprises two plastic half-shrouds.

5. The combination according to claim 4, wherein said two-half-shrouds comprise two identical half-shrouds.

6. The combination according to claim 4, comprising means for fastening said two half-shrouds to each other.

7. The combination according to claim 6, wherein said two-half-shrouds comprise two identical half-shrouds.

8. The combination according to claim 6, wherein said means for fastening comprise hooks and shoulders.

9. The combination according to claim 8, wherein said two-half-shrouds comprise two identical half-shrouds.

10. A device for making branch connections to screened cables, comprising:

rings adapted to be crimped on an exposed metal braid of screened cables with a hexagonal crimp;

a parallelepipedic metal casing composed of two half-shells comprising a first half-shell and a second half shell, said first half-shell comprising a first base, a first lateral wall extended by a skirt and first notches on said first lateral wall; said second half-shell comprising a second base, a second later wall and second notches on said second lateral wall corresponding to said first notches on said first lateral wall; said first notches and said corresponding second notches forming a holding notch having a hexagonal shape corresponding to the hexagonal shape of said crimp; and said skirt of said first lateral wall being adapted to be inserted into said second lateral wall of said second half-shell;

at least one projection and at least one corresponding recess on said extended skirt and said second lateral wall capable of interacting with each other after insertion of said skirt into said second lateral wall to fix said first half-shell and said second half-shell together; and an insulative shroud adapted to house said metallic casing.

11. The device according to claim 10, wherein said first notches and corresponding second notches comprise equal halves of said holding notches.

12. The device according to claim 10, wherein said plastic shroud comprises a plastic shroud which is molded onto said metal casing.

13. The device according to claim 12, wherein said first notches and corresponding second notches comprise equal halves of said holding notches.

14. The device according to claim 10, wherein said insulative shroud comprises two plastic half-shrouds.

15. The device according to claim 14, wherein said two-half-shrouds comprise two identical half-shrouds.

16. The device according to claim 14, wherein said first notches and corresponding second notches comprise equal halves of said holding notches.

17. The device according to claim 14, comprising means for fastening said two half-shrouds to each other.

18. The device according to claim 17, wherein said two-half-shrouds two identical half-shrouds.

19. The device according to claim 17, wherein said means for fastening comprise hooks and shoulders.

20. The device according to claim 19, wherein said two-half-shrouds comprise two identical half-shrouds.

* * * * *